United States Patent
Shin et al.

(10) Patent No.: US 11,855,256 B2
(45) Date of Patent: Dec. 26, 2023

(54) METHOD OF MANUFACTURING ARGYRODITE-TYPE SOLID ELECTROLYTE, ARGYRODITE-TYPE SOLID ELECTROLYTE, AND ALL-SOLID-STATE BATTERY COMPRISING THE SOLID ELECTROLYTE

(71) Applicant: SOLIVIS INC., Seoul (KR)

(72) Inventors: Dong Wook Shin, Gyeonggi-do (KR); Sun Ho Choi, Incheon (KR); Chan Hwi Park, Seoul (KR); Ji Yae Do, Seoul (KR); Seungwoo Lim, Seoul (KR); Gi Deok Kim, Seoul (KR)

(73) Assignee: SOLIVIS INC., Seoul (KR)

( * ) Notice: Subject to any disclaimer, the term of this patent is extended or adjusted under 35 U.S.C. 154(b) by 200 days.

(21) Appl. No.: 17/165,384

(22) Filed: Feb. 2, 2021

(65) Prior Publication Data
US 2021/0242493 A1    Aug. 5, 2021

(30) Foreign Application Priority Data
Feb. 3, 2020    (KR) .................. 10-2020-0012561

(51) Int. Cl.
*H01M 10/0562*    (2010.01)
*H01M 10/0525*    (2010.01)
(Continued)

(52) U.S. Cl.
CPC ......... *H01M 10/0562* (2013.01); *C01B 25/14* (2013.01); *H01M 10/0525* (2013.01);
(Continued)

(58) Field of Classification Search
CPC ......... H01M 10/0562; H01M 10/0525; H01M 10/0585; H01M 2300/008; H01M 10/052;
(Continued)

(56) References Cited

U.S. PATENT DOCUMENTS

2019/0173127 A1* 6/2019 Jang .................. H01M 10/0562

FOREIGN PATENT DOCUMENTS

KR    10-2019-0066792 A    6/2019

OTHER PUBLICATIONS

Choi et al. Application of Rod-Like Li6PS5Cl Directly Synthesized by a Liquid Phase Process to Sheet-Type Electrodes for All-Solid-State Lithium Batteries, Journal of The Electrochemical Society, 2019, vol. 166, No. 3, pp. A5193-A5200 (8 pages total) (Year: 2019).*

(Continued)

*Primary Examiner* — Daniel S Gatewood
(74) *Attorney, Agent, or Firm* — Sughrue Mion, PLLC

(57) ABSTRACT

A method of manufacturing an argyrodite-type solid electrolyte, an argyrodite-type solid electrolyte, and an all-solid-state battery including the argyrodite-type solid electrolyte are provided. The method includes a first step of adding precursors represented by the following Formulas 1 and 2 into a polar aprotic solvent, followed by stirring to obtain a reaction solution; a second step of adding $P_2S_5$ into the stirred reaction solution, followed by further stirring to form a precipitate obtained as a result of the reaction in the reaction solution; and a third step of drying and heat-treating the reaction solution in which the precipitate is formed to obtain a solid electrolyte: [Formula 1] $A_2S$ [Formula 2] AX wherein A represents an alkali metal, and X represents an element of the halogen group.

9 Claims, 11 Drawing Sheets

(51) Int. Cl.
  *H01M 10/0585* (2010.01)
  *C01B 25/14* (2006.01)
(52) U.S. Cl.
  CPC ..... *H01M 10/0585* (2013.01); *C01P 2002/30* (2013.01); *C01P 2002/72* (2013.01); *C01P 2002/74* (2013.01); *C01P 2002/77* (2013.01); *C01P 2002/82* (2013.01); *C01P 2002/86* (2013.01); *C01P 2006/40* (2013.01); *H01M 2300/008* (2013.01)
(58) Field of Classification Search
  CPC ............ H01M 2300/0068; C01B 25/14; C01P 2002/30; C01P 2002/72; C01P 2002/74; C01P 2002/77; C01P 2002/82; C01P 2002/86; C01P 2006/40; Y02E 60/10; Y02P 70/50; H01B 1/10
  See application file for complete search history.

(56) References Cited

OTHER PUBLICATIONS

Sunho Choi et al., "Application of Rod-Like Li6PS5Cl Directly Synthesized by a Liquid Phase Process to Sheet-Type Electrodes for All-Solid-State Lithium Batteries", Journal of The Electrochemical Society, 2019, vol. 166, No. 3, pp. A5193-A5200 (8 pages total).

* cited by examiner

⁷Li NMR analysis

³¹P NMR analysis

METHOD OF MANUFACTURING ARGYRODITE-TYPE SOLID ELECTROLYTE, ARGYRODITE-TYPE SOLID ELECTROLYTE, AND ALL-SOLID-STATE BATTERY COMPRISING THE SOLID ELECTROLYTE

CROSS-REFERENCE TO RELATED APPLICATION

This application claims priority to and the benefit of Korean Patent Application No. 2020-0012561, filed Feb. 3, 2020, the disclosure of which is incorporated herein by reference in its entirety.

BACKGROUND

1. Field of the Invention

The present invention relates to an electrolyte, and more particularly, to a sulfide solid electrolyte.

2. Discussion of Related Art

With the widespread use of small electronic devices and electric vehicles, there is an increasing demand for secondary batteries having high energy density. In recent years, lithium secondary batteries using lithium ions have been widely researched and used as the secondary batteries.

Since conventional lithium secondary batteries use a flammable liquid electrolyte and the risk of ignition and explosion is very high due to an exothermic reaction between the liquid electrolyte and the active material; thus, they require strict packaging with a bulky, heavy, and strict cooling device. Therefore, it is difficult to increase their energy density over a certain level. To overcome this problem, attempts have been made to research an all-solid-state secondary battery in which a flammable liquid electrolyte is replaced with a safer inorganic ceramic material. The all-solid-state secondary battery has come into the spotlight as a next-generation secondary battery because it can realize high energy density due to its high safety.

Meanwhile, solid electrolytes are divided into oxide-based and sulfide-based electrolytes. In this case, the sulfide-based solid electrolytes show higher ionic conductivity than the oxide-based electrolytes. These sulfide-based solid electrolytes may be manufactured by a mechanical milling method. In this case, it is difficult to mass-produce low-cost solid electrolytes as production equipment for the mechanical milling method is very difficult to increase in size and the mechanical milling method requires high production costs.

SUMMARY OF THE INVENTION

The present invention is directed to providing a solid electrolyte using a novel method rather than conventional mechanical milling methods.

Also, the present invention is directed to providing a solid electrolyte having an ionic conductivity improved than that of a conventional solution synthesis but similar to that of the conventional mechanical milling method while produced using a new solution synthesis method capable of mass production.

However, the technical objects of the present invention are not limited to the technical objects as described above, and other objects of the present invention which are not stated herein will become more apparent to those of ordinary skill in the art by describing in detail exemplary embodiments thereof.

One aspect of the present invention provides a method of manufacturing an argyrodite-type solid electrolyte. The method includes a first step of adding precursors represented by the following Formulas 1 and 2 into a polar aprotic solvent, followed by stirring to obtain a reaction solution; a second step of adding $P_2S_5$ into the stirred reaction solution, followed by further stirring to form a precipitate obtained as a result of the reaction in the reaction solution; and a third step of drying and heat-treating the reaction solution in which the precipitate is formed to obtain a solid electrolyte:

$A_2S$ [Formula 1]

$AX$ [Formula 2]

wherein A represents an alkali metal, and X represents an element of the halogen group.

The polar aprotic solvent may be a solvent having a nitrile group. Particularly, the polar aprotic solvent may be acetonitrile.

In the first step, the precursors represented by Formulas 1 and 2 may be at least partially dissolved in the solvent.

In the second step, after solvated $P_2S_6^{2-}$ is formed in the reaction solution, $P_2S_6^{2-}$ may be converted into solvated $PS_4^{3-}$, and a portion of $PS_4^{3-}$ may form amorphous $A_6PS_5X$ as a precipitate along with $A^+$, $A_2S$, and $AX$. In the second step, the reaction solution may include a deposit including the precipitate and a supernatant above the deposit, and the reaction may be performed until a fraction of $PS_4^{3-}$ ions becomes higher than a fraction of $P_2S_6^{2-}$ ions in the supernatant, and a fraction of the precipitated $A_6PS_5X$ becomes higher than a fraction of $A_2S$ in the deposit. In the third step, the amorphous $A_6PS_5X$ may be crystallized through heat treatment so that as the amorphous $A_6PS_5X$ can be converted into $A_6PS_5X$ having an argyrodite crystal phase.

In the second step, another portion of the $PS_4^{3-}$ may precipitate into $A_3PS_4$ along with $A^+$. In the third step, $A_2S$ and $AX$ may be reacted with the $A_3PS_4$ precipitate and $3A^+$ and $PS_4^{3-}$ remaining in the supernatant, and then crystallized to form $A_6PS_5X$ having an argyrodite crystal phase.

Another aspect of the present invention provides an argyrodite-type solid electrolyte. The solid electrolyte may contain 80 to 99.9% by weight or more of $A_6PS_5X$ having an argyrodite crystal phase; and 0.1 to 20% by weight of $A_2S$ and/or $AX$, wherein A represents an alkali metal, and X represents an element of the halogen group. The solid electrolyte may have an ionic conductivity of 1.5 to 20 mS/cm. Specifically, the $A_6PS_5X$ may be included at a content of 92 to 98% by weight, and the $A_2S$ and/or $AX$ may be included at a content of 2 to 8% by weight. The solid electrolyte may have an ionic conductivity of 3 to 9 mS/cm.

Still another aspect of the present invention provides a sulfide-based all-solid-state battery. The all-solid-state battery may include a positive electrode, a solid electrolyte layer, and a negative electrode stacked in sequential order, wherein the solid electrolyte layer includes the solid electrolyte having a particle shape.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
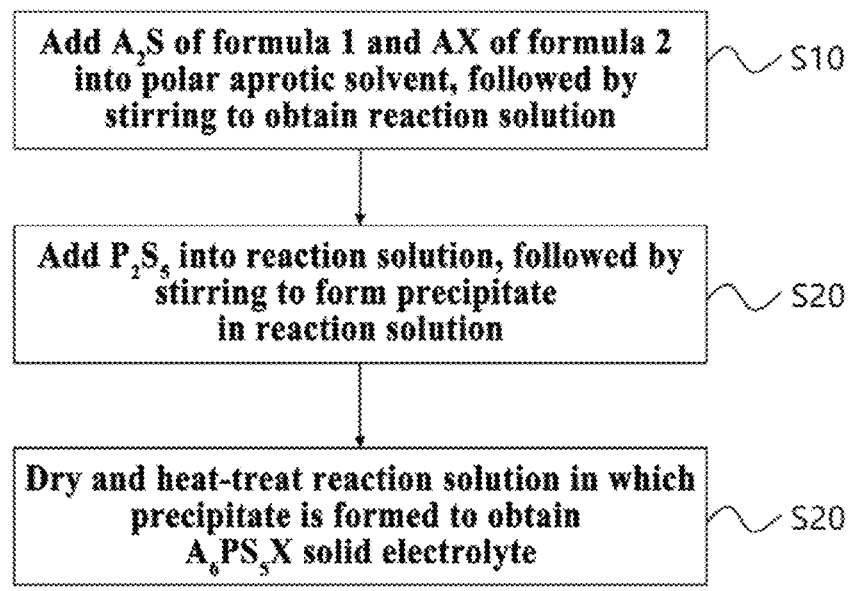
FIG. 1 is a flow chart showing a method of manufacturing a solid electrolyte having an argyrodite crystal phase according to one embodiment of the present invention.

Hereinafter, preferred embodiments of the present invention will be described in detail with reference to the accompanying drawings in order to describe the present invention in further detail. However, the present invention is not limited to the embodiments disclosed below and can be implemented in various forms. Throughout the specification, like elements have like reference numerals. In a case where it is stated that one layer is formed "on" another layer throughout the specification, this refers to the one layer being directly on the other layer or to a third layer being interposed between the one layer and the other layer.

Method of Manufacturing Solid Electrolyte Having Argyrodite Crystal Phase

FIG. 1 is a flow chart showing a method of manufacturing a solid electrolyte having an argyrodite crystal phase according to one embodiment of the present invention. The solid electrolyte may be a sulfide-based solid electrolyte.

Referring to FIG. 1, precursors represented by the following Formulas 1 and 2 may be added into a polar aprotic solvent, followed by stirring to obtain a reaction solution (first step S10).

$$A_2S \qquad \text{[Formula 1]}$$

wherein A may represent an alkali metal, for example, Li or Na.

$$AX \qquad \text{[Formula 2]}$$

wherein A is as defined in Formula 1, and X may represent an element of the halogen group, for example, Cl, Br, or I.

The polar aprotic solvent is a solvent having a nitrile group, that is, a nitrile-based solvent. In this case, the polar aprotic solvent may be acetonitrile which is easily removed due to its relatively low boiling point.

In the first step, the stirring temperature and the stirring time may be set to temperature and time ranges in which the precursors represented by Formulas 1 and 2 may be at least partially dissolved in the solvent. As one example, the stirring time may be in a range of 0.5 to 1.5 hours, but the present invention is not limited thereto.

P$_2$S$_5$ may be added into the stirred reaction solution, followed by further stirring to form a precipitate obtained as a result of the reaction in the reaction solution (second step S20). The precipitate may be a reaction product. In this step, the solvent in the reaction solution may be identical to the solvent used in the first step, and another solvent may not be added. Also, P$_2$S$_5$ may be added in a solid phase that is not dissolved in other solvents.

[Reaction Scheme]

5A$_2$S+P$_2$S$_5$+2AX→P$_2$S$_6^{2-}$+2A$^+$+4A$_2$S+2AX      Step A:

P$_2$S$_6^{2-}$+2A$^+$+4A$_2$S+2AX→P$_2$S$_7^{4-}$+4A$^+$+3A$_2$S+2AX      Step B:

P$_2$S$_7^{4-}$+4A$^+$+3A$_2$S+2AX→2PS$_4^{3-}$+6A$^+$+2A$_2$S+2AX      Step C:

2PS$_4^{3-}$+6A$^+$+2A$_2$S+2AX→A$_6$PS$_5$X (amorphous solid)+PS$_4^{3-}$+3A$^+$+A$_2$S+AX      Step D:

wherein A is as defined in Formula 1, and X is as defined in Formula 2.

The formation of the precipitate may be explained from the above reaction scheme: Steps A to C may occur in the supernatant, and the precipitates formed in Step D may be solid electrolytes A$_6$PS$_5$X and A$_3$PS$_4$ in an amorphous state. Specifically, A$_2$S(s) and P$_2$S$_5$(s) in the reaction solution may be slowly dissolved to form solvated P$_2$S$_6^{2-}$ (Step A), which is then converted into P$_2$S$_7^{4-}$ (Step B) and then into solvated PS$_4^{3-}$ (Step C), a portion of PS$_4^{3-}$ may form amorphous A$_6$PS$_5$X as a precipitate along with A$^+$, A$_2$S, and AX, and another portion of PS$_4^{3-}$ may precipitate into A$_3$PS$_4$ along with A$^+$.

Meanwhile, a deposit in the reaction solution may include the precipitate, and may include the precursors $A_2S$ and $AX$ which are still not dissolved as well. However, in the first step, $A_2S$ and $AX$, which are not easily dissolved in the solvent as compared to $P_2S_5$, may be first added and dissolved in the solvent, and then reacted with $P_2S_5$ in the second step to more effectively form $A_6PS_5X$ (an amorphous solid) as a reaction product of $A_2S$, $AX$, and $P_2S_5$. Also, as the polar aprotic solvent is used, $PS_4^{3-}$ serving as the product in the supernatant may be solvated and stabilized to increase a forward reaction rate as well.

In the second step, the reaction time and the reaction temperature may be adjusted so that a fraction of $PS_4^{3-}$ ions becomes higher than a fraction of $P_2S_6^{2-}$ ions in the solvent of the reaction solution, that is, in the supernatant, and a fraction of the precipitated $A_6PS_5X$ and a fraction of the $A_3PS_4$ become higher than a fraction of $A_2S$ in the deposit. Here, the fraction of the $A_3PS_4$ may be higher than the fraction of the $A_6PS_5X$. Specifically, in the deposit, the $A_3PS_4$ may have a fraction of 50 to 65%, the $A_6PS_5X$ may have a fraction of 25 to 35%, the $A_2S$ may have a fraction of 5 to 15%, and the $AX$ may have a fraction of 1 to 10%. More specifically, in the deposit, the $A_3PS_4$ may have a fraction of 55 to 60%, the $A_6PS_5X$ may have a fraction of 27 to 33%, the $A_2S$ may have a fraction of 7 to 13%, and the $AX$ may have a fraction of 2 to 7%. In addition, the reaction time and reaction temperature in the second step may be adjusted in a range where reaction products are not oxidized by the surrounding air to generate impurities. For example, the reaction temperature may be in a range of 20 to 65 Celsius degrees (° C.), specifically in a range of 25 to 60° C., and the total reaction time of the first and second steps may be in a range of 10 to 120 hours, specifically in a range of 20 to 100 hours, and more specifically in a range of 22 to 80 hours. Here, the fraction of $P_2S_6^{2-}$ ions and the fraction of $PS_4^{3-}$ ions may be obtained from the relative areas of $^{31}P$ NMR peaks corresponding to $P_2S_6^{2-}$ and $PS_4^{3-}$. Also, the fraction of $A_2S$, the fraction of $A_6PS_5X$, and the fraction of $A_3PS_4$ may be, for example, obtained from the relative areas of $^7A$ NMR (A represents an alkali metal) peaks for example, $^7Li$ or $^7Na$ NMR peaks which correspond to $A_2S$, $A_6PS_5X$, and $A_3PS_4$.

Next, the reaction solution in which the precipitate is formed may be dried and heat-treated to obtain a solid electrolyte (third step S30). Specifically, the reaction solution may includes the supernatant and the deposit having the precipitate.

The drying step includes removing the solvent from the reaction solution in which the precipitate is formed. In this case, the solvent may be almost completely removed, but some of the solvent may not be removed. Some of the solvent which is not removed may be almost completely removed in the heat treatment step. This drying may be vacuum drying.

However, the solvent used in the first step and the second step may be a polar aprotic solvent. Because a polar protic solvent such as ethanol, etc. is not included in the solvent, the solvent in the solid electrolyte may not remain as an impurity after the drying and heat treatment steps.

In the heat treatment step, the $A_6PS_5X$ (an amorphous solid) generated in the precipitate during the second step may be crystallized so that the $A_6PS_5X$ can be obtained as the solid electrolyte. Also, $A_3PS_4$ present in the precipitate and $3A^+$ and $PS_4^{3-}$ present in the supernatant may be further reacted with $A_2S$ and $AX$, and then crystallized to generate $A_6PS_5X$ having an argyrodite crystal phase. The heat treatment may be performed at approximately 500 to 600° C. for 5 to 30 hours.

As described above in the second step, because the $A_6PS_5X$ (amorphous solid) is formed at a high generation rate in the second step, the $A_6PS_5X$ having an argyrodite crystal phase obtained in the third step may be obtained with high purity. Also, as previously described above, as acetonitrile is used as one example of the polar aprotic solvent, the solvent does remain as an impurity in the solid electrolyte, thereby improving the purity of the solid electrolyte as well. Also, the solid electrolyte obtained through the method consisting of the first to third steps may have a particle size of several micrometers for example 1 to 10 µm. This may result in an enhanced contact area with an active material in the all-solid-state battery, as will be described later.

The solid electrolyte obtained in this third step may contain 80% by weight or more of $A_6PS_5X$ having an argyrodite crystal phase, and may contain 20% by weight or less of impurities, specifically the residual precursor $A_2S$ and/or $AX$. For example, the resulting product obtained in the third step may contain 80 to 99.9% by weight, specifically 90 to 99% by weight, and more specifically 92 to 98% by weight, 92 to 97% by weight, or 92 to 96% by weight of the argyrodite crystal phase. The impurities may be included at a content of 0.1 to 20% by weight, specifically 1 to 10% by weight, and more specifically 2 to 8% by weight, 3 to 8% by weight, or 4 to 8% by weight.

Also, the resulting product, that is, a sulfide-based solid electrolyte, obtained in the third step may have an ionic conductivity of 1.5 to 20 mS/cm, specifically 2 to 10 mS/cm, and more specifically 3 to 9 mS/cm, 3 to 5 mS/cm or 3 to 4 mS/cm.

All-Solid-State Battery

Figure 2:
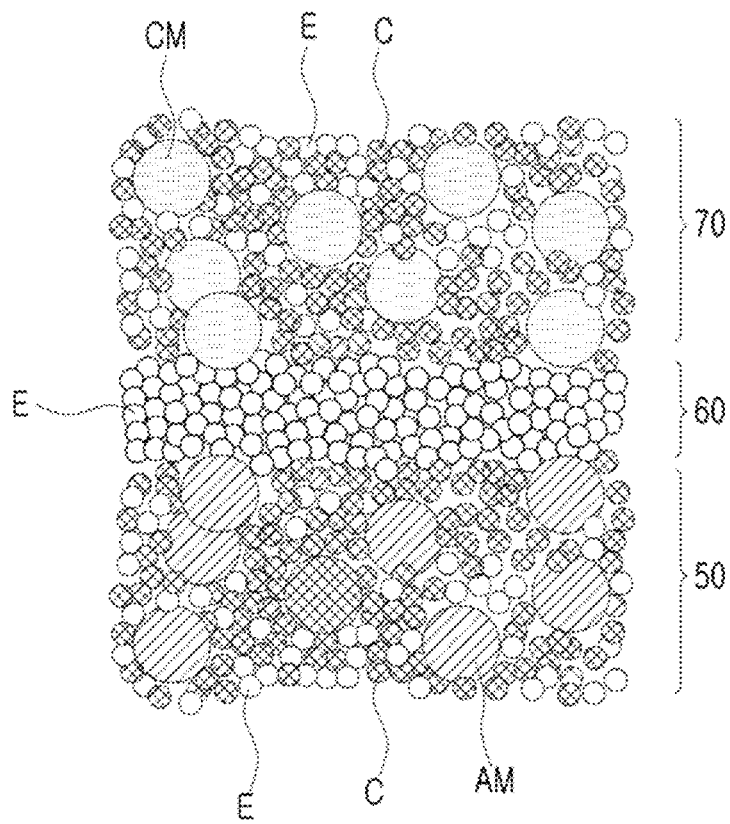
FIG. 2 is a cross-sectional view schematically showing a cross section of an all-solid-state battery according to one embodiment of the present invention.

FIG. 2 is a cross-sectional view schematically showing a cross section of an all-solid-state battery according to one embodiment of the present invention.

Referring to FIG. 2, the all-solid-state battery is a sulfide-based all-solid-state battery that may include a positive electrode 50, a solid electrolyte layer 60, and a negative electrode 70 stacked in sequential order. Here, the solid electrolyte layer 60 may be a layer in which solid electrolyte particles E are stacked, the positive electrode 50 may be a mixed layer of positive electrode active material particles AM, solid electrolyte particles E and conductive material particles C, and the negative electrode may be a mixed layer of negative electrode active material particles CM, solid electrolyte particles E and conductive material particles C.

The solid electrolyte particles E may contain 80% by weight or more of $A_6PS_5X$ having an argyrodite crystal phase, and contain 20% by weight or less of impurities, specifically the residual precursors $A_2S$ and/or $AX$. For example, the solid electrolyte particles E may contain 80 to 99.9% by weight, specifically 90 to 99% by weight, and more specifically 92 to 98% by weight, 92 to 97% by weight, or 92 to 96% by weight of the argyrodite crystal phase. The impurities may be included at a content of 0.1 to 20% by weight, specifically 1 to 10% by weight, and more specifically 2 to 8% by weight, 3 to 8% by weight, or 4 to 8% by weight. Also, the solid electrolyte particles E may have an ionic conductivity of 1.5 to 20 mS/cm, specifically 2 to 10 mS/cm, and more specifically 3 to 9 mS/cm, 3 to 5 mS/cm or 3 to 4 mS/cm.

The solid electrolyte particles E may be formed using a method described with reference to FIG. 1.

The positive electrode active material particles AM may be one or more selected from the group consisting of $Li_{1-x}MPO_4$ (M=Fe, Mn or Ni, and $0 \leq x \leq 1$), $Li_{1-x}MnO_2$ ($0 \leq x \leq 1$), $LiCoO_2$, $Li_{1-x}Ni_aMn_bCo_cO_2$ ($0 \leq x \leq 1$, a+b+c=1, $0 \leq a \leq 1$, $0 \leq b \leq 1$, and $0 \leq c \leq 1$), and $Li_{1-x}Ni_aCo_bAl_cO_2$ ($0 \leq x \leq 1$, a+b+c=1, $0 \leq a \leq 1$, $0 \leq b \leq 1$, and $0 \leq c \leq 1$). The negative electrode active material particles CM may be carbon (C) such as graphite, etc. or metal particles such as, silicon (Si), or tin (Sn). Meanwhile, the conductive material particles C may be carbon black such as Ketjen black, acetylene black, or the like. However, the present invention is not limited thereto, and various materials used in the related art may be used as the positive electrode active material particles AM, the negative electrode active material particles CM, and the conductive material particles C.

Individual layers of the positive electrode 50, the solid electrolyte layer 60, and the negative electrode 70 may be stacked in sequential order by forming a slurry containing the corresponding particles, and subjecting the slurry to tape casting, screen printing, or electrostatic spraying. Thereafter, after the stacking is completed, the stacked layers may be pressed using one or more methods selected from the group consisting of hot pressing, roll pressing, and warm isostatic pressing (WIP).

Hereinafter, preferred examples are presented to aid in understanding the present invention. However, it should be understood that the following examples are merely intended to aid in understanding the present invention, and are not intended to limit the scope of the present invention.

Electrolyte Preparation Examples 1 to 12

(1) Generation of Reaction Solution $Li_2S$ and LiCl were added into acetonitrile having a reaction temperature as mentioned in the following Table 1, and then stirred at 280 rpm for a reaction time as mentioned in the following Table 1 to obtain a reaction solution.

(2) Formation of Precipitate in Reaction Solution $P_2S_5$ was added into the reaction solution, and stirred at 280 rpm for a reaction time as mentioned in the following Table 1 at the same temperature as the reaction temperature to form a precipitate in the reaction solution, thereby obtaining a mixture including a supernatant and a deposit including the precipitate. In this reaction, a molar ratio (i.e., $Li_2S:P_2S_5:LiCl$) of the precursors was in a range of 5:1:2. Also, a concentration of the reaction solution to which all the $Li_2S$, LiCl, and $P_2S_5$ were added was 0.06 M.

(3) Drying and Heat Treatment

After the reaction was completed, the reaction solution which is the mixture was vacuum-dried at 30° C. for 24 hours using a low-temperature trap device to volatilize the solvent from the reaction solution in which the precipitate was formed. Thereafter, the resulting product from which the solvent was volatilized was heat-treated at 550° C. for 10 to 24 hours to obtain a solid electrolyte.

Electrolyte Comparative Examples 1 and 2

An argyrodite solid electrolyte was obtained in the same manner as in Electrolyte Preparation Example 1, except that the reaction solution was stirred at 280 rpm for 24 hours after all the $Li_2S$, $P_2S_5$, and LiCl were added into acetonitrile having a reaction temperature as mentioned in the following Table 1 one time.

TABLE 1

| | Reaction temperature | Reaction time after addition of $Li_2S$ and LiCl | Reaction time after addition of P2Ss | Total reaction time |
|---|---|---|---|---|
| Preparation Example 1 | 30° C. | 1 minute | 9 minutes | 10 minutes |
| Preparation Example 2 | | 10 minutes | 50 minutes | 1 hour |
| Preparation Example 3 | | 1 hour | 4 hours | 5 hours |
| Preparation Example 4 | | 1 hour | 23 hours | 24 hours |
| Preparation Example 5 | | 1 hour | 35 hours | 36 hours |
| Preparation Example 6 | | 1 hour | 71 hours | 72 hours |
| Preparation Example 7 | | 1 hour | 119 hours | 120 hours |
| Preparation Example 8 | 40° C. | 1 hour | 23 hours | 24 hours |
| Preparation Example 9 | 50° C. | 1 hour | 23 hours | |
| Preparation Example 10 | 60° C. | 1 hour | 23 hours | |
| Preparation Example 11 | 70° C. | 1 hour | 23 hours | |
| Comparative Example 1 | 30° C. | — | — | 24 hours |
| Comparative Example 2 | 50° C. | — | — | 24 hours |

Figure 3A:
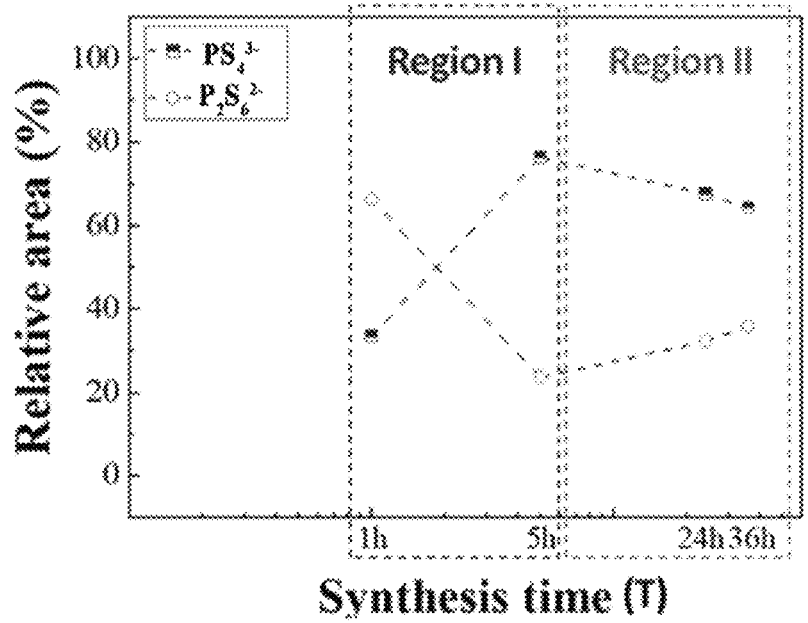
FIG. 3A is a graph showing relative areas of individual peaks obtained from a $^{31}$P NMR spectrum of a supernatant separated from a mixture including the supernatant and a deposit having a precipitate, which are obtained in a step of forming a precipitate in the course of Electrolyte Preparation Examples 2 to 5.
Figure 3B:
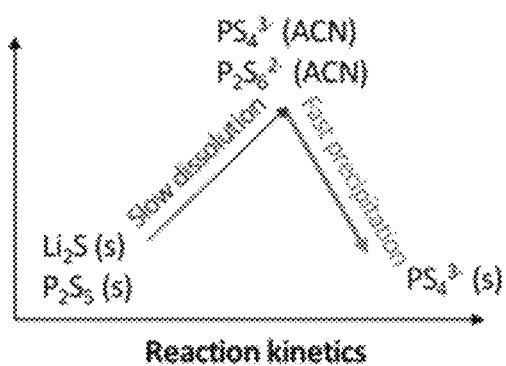
FIG. 3B is a graph showing reaction kinetics derived from the relative areas of the peaks of FIG. 3A.
Figure 4A:
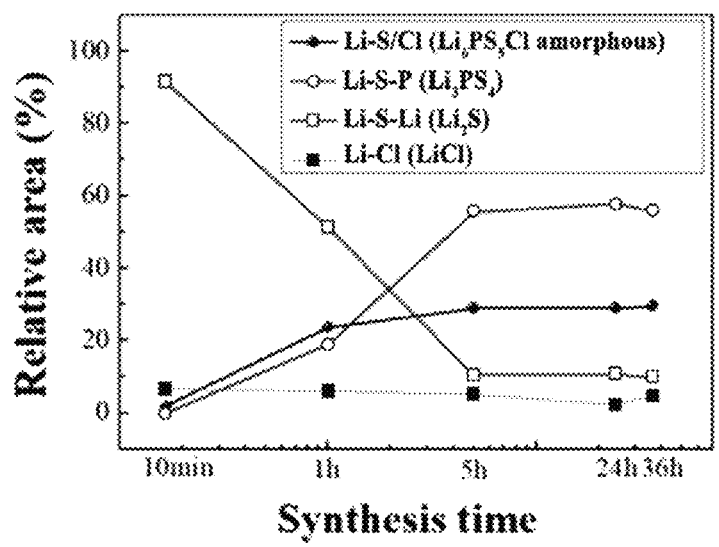
FIGS. 4A and 4B are respectively a graph showing relative areas of individual peaks obtained from a $^{7}$Li NMR spectrum and a $^{31}$P NMR spectrum of a deposit separated from a mixture including a supernatant and the deposit having a precipitate, which are obtained in a step of forming a precipitate in the course of Electrolyte Preparation Examples 1 to 5.
Figure 4B:
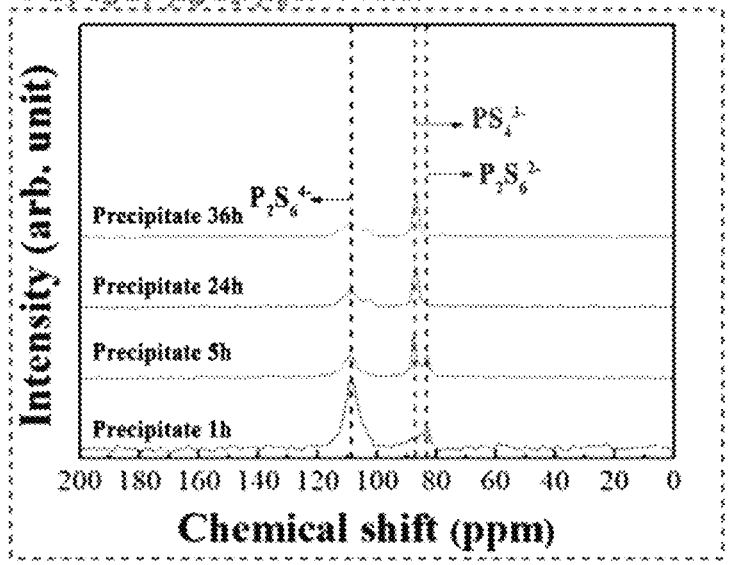

Total reaction time = Reaction time after addition of $Li_2S$ and LiCl + Reaction time after addition of $P_2S_5$ FIG. 3A is a graph showing relative areas of individual peaks obtained from a $^{31}P$ NMR spectrum of a supernatant separated from a mixture including the supernatant and a deposit having a precipitate, which are obtained in a step of forming a precipitate in the course of Electrolyte Preparation Examples 2 to 5, and FIG. 3B is a graph showing reaction kinetics derived from the relative areas of the peaks of FIG. 3A. Meanwhile, FIGS. 4A and 4B are respectively a graph showing relative areas of individual peaks obtained from a $^7Li$ NMR spectrum and a $^{31}P$ NMR spectrum of a deposit separated from a mixture including a supernatant and a deposit having a precipitate, which are obtained in a step of forming a precipitate in the course of Electrolyte Preparation Examples 1 to 5. The supernatant and the deposit were not subjected to solvent drying or heat treatment.

Referring to FIGS. 3A and 3B, it can be seen that the $P_2S_6^{2-}$ ions were detected at a high fraction as compared to the $PS_4^{3-}$ ions in the supernatant when the total reaction time was 1 hour, but when the total reaction time reached 5 hours, the $PS_4^{3-}$ ions were detected at a high fraction as compared to the $P_2S_6^{2-}$ ions, and a fraction of the $PS_4^{3-}$ ions gradually decreased thereafter. Based on these results, it can be assumed that, after $Li_2S(s)$ and $P_2S_5(s)$ were slowly dissolved in the reaction solution to form solvated $P_2S_6^{2-}$ ions, the solvated $P_2S_6^{2-}$ ions were converted into solvated $PS_4^{3-}$ ions until the reaction time reached 5 hours, and, when the reaction time exceeds 5 hours, the $PS_4^{3-}$ ions settled as a precipitate including $PS_4^{3-}$ (FIG. 3B).

Referring to FIGS. 4A and 4B, it can be seen that a fraction of $Li_3PS_4$ and a fraction of $Li_6PS_5Cl$ increased in the deposit until the total reaction time reached 5 hours, wherein the fraction of $Li_3PS_4$ was higher than the fraction of $Li_6PS_5Cl$. Based on these results, it can be assumed that a majority of the precipitate including $PS_4^{3-}$ formed by deposition of the $PS_4^{3-}$ ions in the supernatant as described in FIGS. 3A and 3B was $Li_3PS_4$, and the rest of the precipitate was $Li_6PS_5Cl$ (FIG. 4A). Meanwhile, it can be seen that the fraction of $P_2S_6^{2-}$ ions in the precipitate gradually decreased and the fraction of $PS_4^{3-}$ ions gradually increased as the reaction time increased in the $^{31}$P NMR spectrum (FIG. 4B).

Figure 5A:
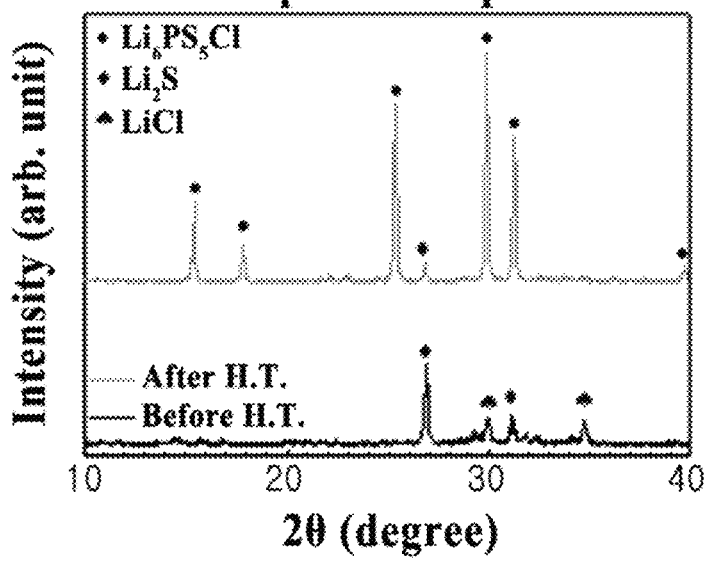
FIG. 5A is an XRD graph of the resulting products obtained before and after heat treatment in the course of Electrolyte Preparation Example 4.
Figure 5B:
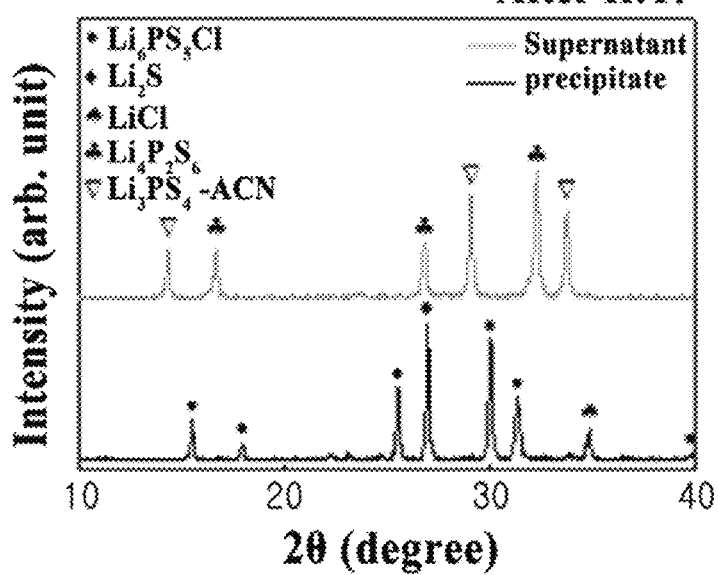
FIG. 5B is an XRD graph of the resulting products obtained by separating a deposit having a precipitate and a supernatant, which are obtained in a step of forming a precipitate in Electrolyte Preparation Example 4, and separately subjecting the deposit and the supernatant to subsequent drying and heat treatment.

FIG. 5A is an XRD graph of the resulting products obtained before and after heat treatment in the course of Electrolyte Preparation Example 4, and FIG. 5B is an XRD graph of the resulting products obtained by separating a deposit having a precipitate and a supernatant, which are obtained in a step of forming a precipitate in Electrolyte Preparation Example 4, and separately subjecting the deposit and the supernatant to subsequent drying and heat treatment.

Referring to FIG. 5B, it can be seen that an amount of the impurities in the obtained phases increased because the resulting products obtained by separating the deposit and the supernatant and separately subjecting the deposit and the supernatant to subsequent drying and heat treatment could not have a molar ratio of the precursors consistent with stoichiometry. It can be seen that a high crystal fraction of $Li_6PS_5Cl$ was observed in the deposit including the precipitate but there was a low ionic conductivity (0.68 mS/cm) due to the impurities, whereas a high crystal fraction of $Li_3PS_4$ or $Li_4P_2S_6$ was observed in the supernatant.

Referring to FIG. 5A, when the deposit including the precipitate and the supernatant were dried at the same time but were not subjected to heat treatment (before the heat treatment), only $Li_3PS_4 \cdot ACN$ and the precursors $Li_2S$ and LiCl were detected. $Li_3PS_4 \cdot ACN$ was present in the intermediate before the heat treatment, and $Li_4P_2S_6$ was thermally stable, so it precipitated after the heat treatment. Prior to the heat treatment, $Li_4P_2S_6$ was present in an amorphous state or were not present because the intermediate was well formed stoichiometrically. As a result, it can be seen that $Li_6PS_5Cl$ having few impurities and excellent crystallinity was generated after the deposit having the precipitate and the supernatant were dried at the same time, followed by heat treatment. Based on these results, it was assumed that $Li_6PS_5Cl$ in an amorphous state was crystallized by heat treatment, and $Li_3PS_4$ or $Li_4P_2S_6$ was further reacted to generate crystalline $Li_6PS_5Cl$.

Figure 6A:
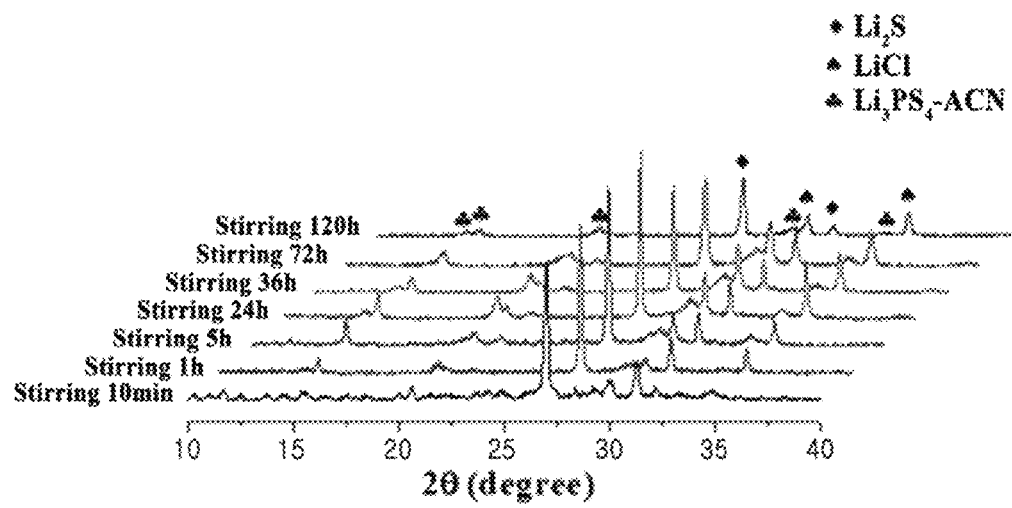
FIG. 6A is an XRD graph of the resulting products obtained before heat treatment in the course of Preparation Examples 1 to 7.
Figure 6B:
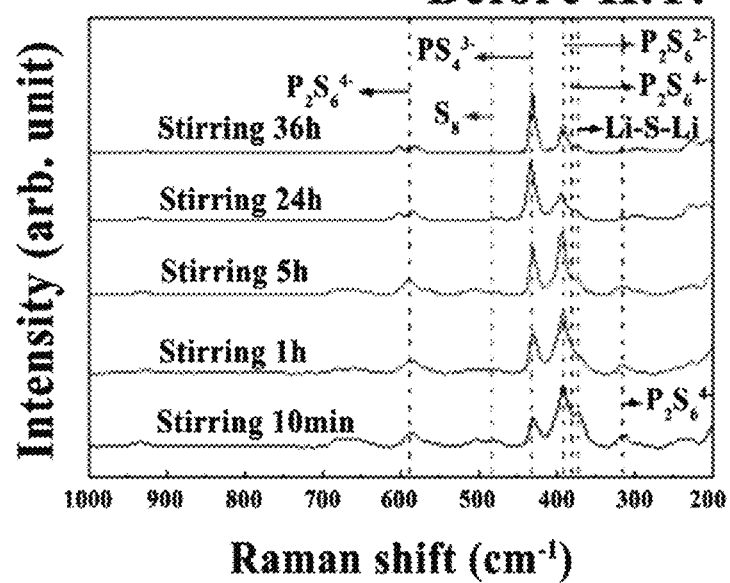
FIG. 6B is a Raman spectrum of the resulting products obtained before heat treatment in the course of Preparation Examples 1 to 5.

FIG. 6A is an XRD graph of the resulting products obtained before heat treatment in the course of Preparation Examples 1 to 7, and FIG. 6B is a Raman spectrum of the resulting products obtained before heat treatment in the course of Preparation Examples 1 to 5.

Referring to FIG. 6A, it can be seen that $Li_2S$ and LiCl penetrated into a crystal structure because the intensities of the peaks corresponding to the precursors $Li_2S$ and LiCl themselves seemed to gradually decrease as the total reaction time increased.

Referring to FIG. 6B, it can be seen that the intensities of the peaks corresponding to $Li_2S$ itself decreased as in FIG. 6A as the reaction time increased, and the intensity of the $P_2S_6^{2-}$ peak was higher than that of the $PS_4^{3-}$ peak when the total reaction time reached 5 hours, but the intensity of the $P_2S_6^{2-}$ peak was lower than that of the $PS_4^{3-}$ peak after the total reaction time of 24 hours. Based on these results, it was assumed that $P_2S_6^{2-}$ was converted into $PS_4^{3-}$.

Figure 7A:
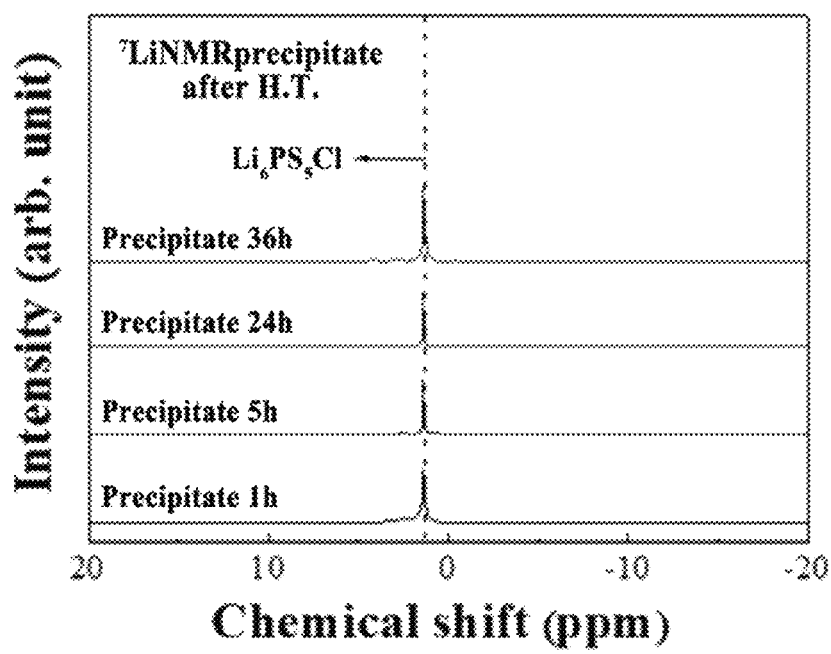
FIGS. 7A and 7B are respectively a $^{7}$Li NMR spectrum and a $^{31}$P NMR spectrum of the resulting products according to Preparation Examples 2 to 5.
Figure 7B:
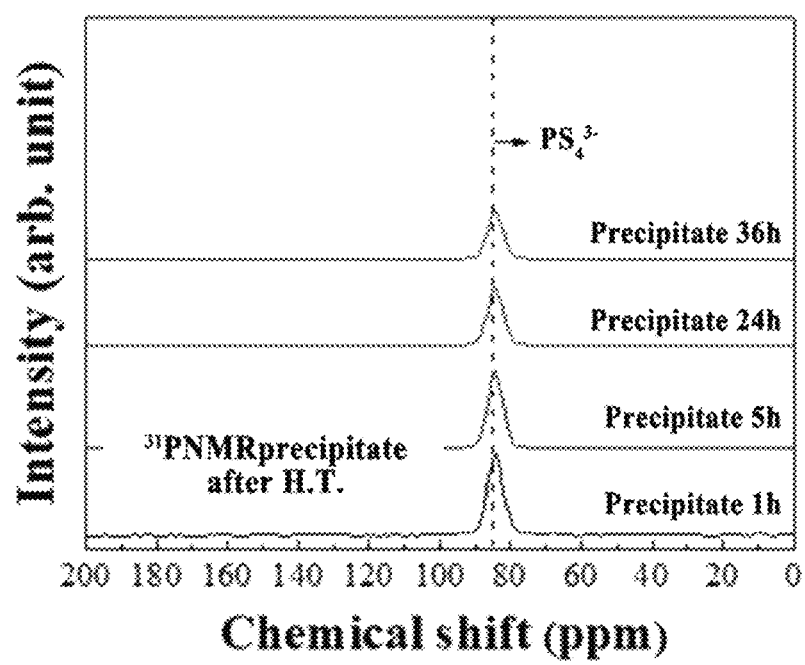

FIGS. 7A and 7B are respectively a $^7$Li NMR spectrum and a $^{31}$P NMR spectrum of the resulting products according to Preparation Examples 2 to 5. The resulting products according to Preparation Examples 2 to 5 refer to products which have undergone all the steps including the heat treatment.

Referring to FIG. 7A, it can be seen that the intensities of the peaks corresponding to $Li_6PS_5Cl$ increased as the total reaction time increased, and $Li_6PS_5Cl$ having excellent crystallinity was obtained when the reaction time reached 36 hours.

Referring to FIG. 7B, it can be assumed that $PS_4^{3-}$ was incorporated into a $Li_6PS_5Cl$ argyrodite crystal structure after the heat treatment because the intensity of the peaks corresponding to $PS_4^{3-}$ decreased as the total reaction time increased.

Figure 8A:
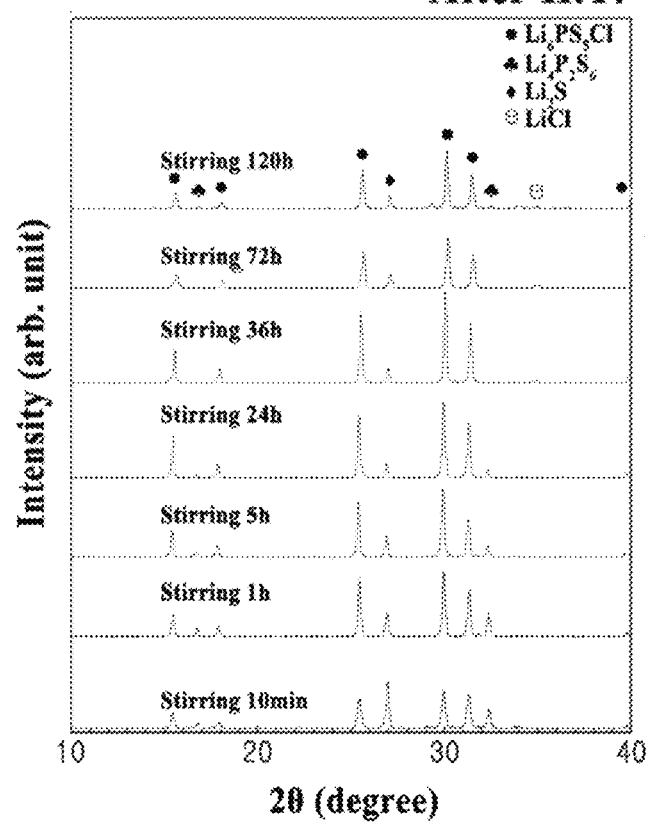
FIG. 8A is an XRD graph of the resulting products according to Preparation Examples 1 to 7 and FIG. 8B is a Raman spectrum of the resulting products according to Preparation Examples 1 to 5.
Figure 8B:
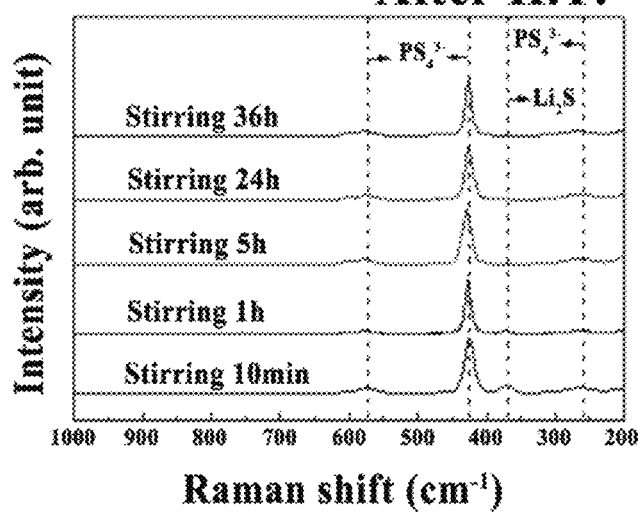

FIG. 8A is an XRD graph of the resulting products according to Preparation Examples 1 to 7 and FIG. 8B is a Raman spectrum of the resulting products according to Preparation Examples 1 to 5. The resulting products according to Preparation Examples 1 to 7 refer to products which have undergone all the steps including the heat treatment.

Referring to FIG. 8A, it can be seen that the intensities of the peaks corresponding to $Li_4P_2S_6$ gradually decreased as the reaction time increased, and then almost disappeared when the reaction time reached 36 hours. It can be seen that LiCl serving as the precursor was detected as an impurity when the reaction time reached 120 hours. It can be seen that $Li_2S$ was detected in all of Preparation Examples 1 to 7, the intensities of the peaks decreased as the reaction time increased, and the peaks corresponding to $Li_6PS_5Cl$ has the highest intensity when the reaction time reached 36 hours.

Referring to FIG. 8B, the peaks corresponding to $Li_2S$ seemed to disappear when the reaction time was greater than 10 minutes, and the peaks corresponding to $PS_4^{3-}$ were continuously detected regardless of the reaction time.

Figure 9:
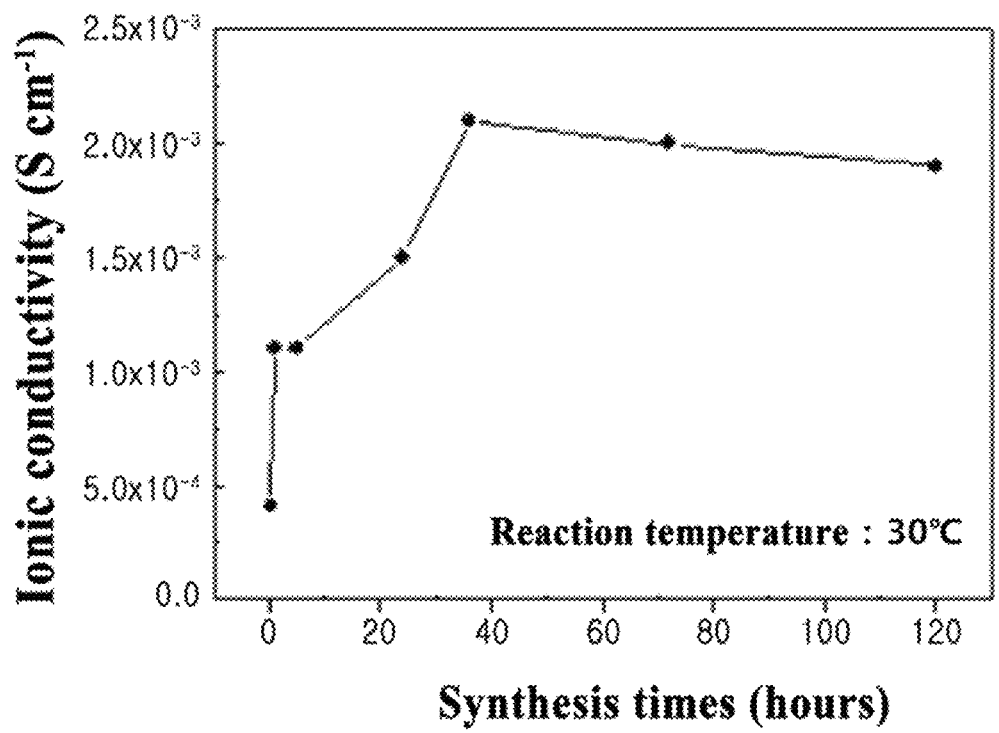
FIG. 9 is a graph showing ionic conductivities of the resulting products according to Preparation Example 1 to 7.

FIG. 9 is a graph showing ionic conductivities of the resulting products according to Preparation Example 1 to 7.

Also, the following Table 2 lists the crystal-phase fractions and ionic conductivities of the resulting products according to Preparation Example 1 to 7.

TABLE 2

| | Reaction temperature (° C.) | Reaction time | Crystal-phase fraction (% by weight) | | | | | Ionic conductivity (mS/cm) |
|---|---|---|---|---|---|---|---|---|
| | | | $Li_6PS_5Cl$ | $Li_2S$ | $Li_4P_2S_6$ | LiCl | $Li_3PO_4$ | |
| Preparation Example 1 | 30 | 10 minutes | 61.5 | 22.5 | 16.0 | — | — | 0.41 |
| Preparation Example 2 | | 1 hour | 75.5 | 8.7 | 15.8 | — | — | 1.1 |
| Preparation Example 3 | | 5 hours | 83.5 | 8.4 | 8.2 | — | — | 1.1 |
| Preparation Example 4 | | 24 hours | 89.4 | 4.9 | 5.7 | — | — | 1.5 |
| Preparation Example 5 | | 36 hours | 90.8 | 7.2 | — | 2.0 | — | 2.1 |

TABLE 2-continued

| | Reaction temperature (° C.) | Reaction time | Crystal-phase fraction (% by weight) | | | | | Ionic conductivity (mS/cm) |
|---|---|---|---|---|---|---|---|---|
| | | | Li$_6$PS$_5$Cl | Li$_2$S | Li$_4$P$_2$S$_6$ | LiCl | Li$_3$PO$_4$ | |
| Preparation Example 6 | | 72 hours | 84.2 | 11.3 | — | 4.6 | — | 2.0 |
| Preparation Example 7 | | 120 hours | 80.2 | 14.0 | — | 5.8 | — | 1.9 |

Referring to FIG. 9 and Table 2, it seemed that the ionic conductivity was improved since Li$_4$P$_2$S$_6$ was not detected and high-purity Li$_6$PS$_5$Cl was detected when the reaction time was greater than 24 hours, specifically when the reaction time was greater than or equal to 36 hours. However, it seemed that the precursors Li$_2$S and LiCl precipitated as the impurities when the reaction time increased to a time greater than 36 hours, and the ionic conductivity was somewhat lowered with an increasing amount of the precursors precipitated as the impurities.

Figure 10:
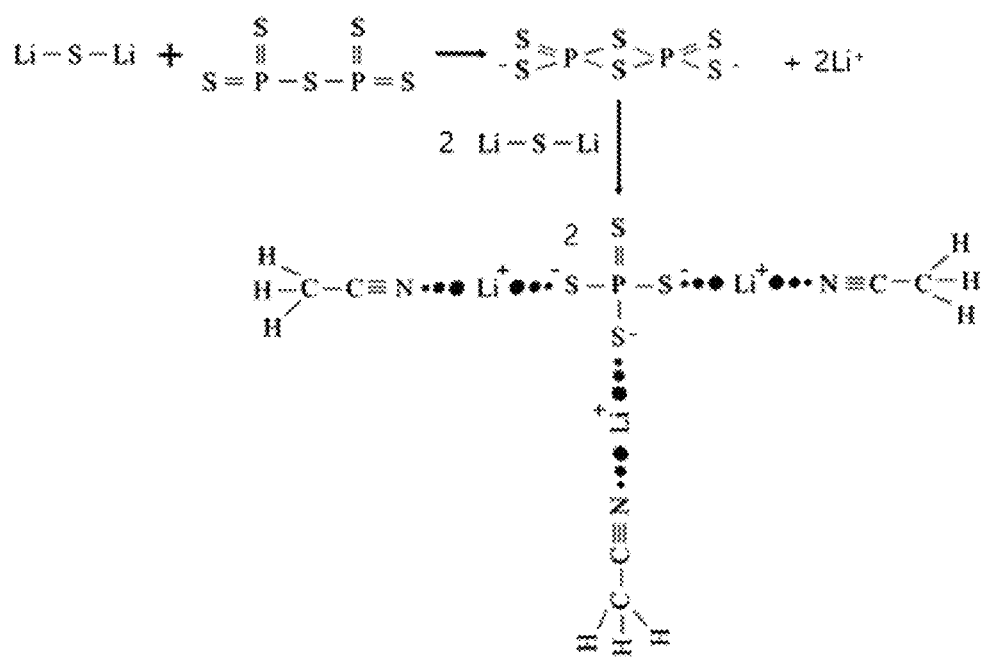
FIG. 10 is a schematic diagram showing a reaction in the supernatant derived from the analysis results as shown in FIGS. 3A, 3B, 4A, 4B, 5A, 5B, 6A, 6B, 7A, 7B, 8A, and 8B.

FIG. 10 is a schematic diagram showing a reaction in the supernatant derived from the analysis results as shown in FIGS. 3A, 3B, 4A, 4B, 5A, 5B, 6A, 6B, 7A, 7B, 8A, and 8B, and FIG. 11 is a schematic diagram showing a reaction in the supernatant and the composition of a deposit including a precipitate, which are derived from the analysis results as shown in FIGS. 3A, 3B, 4A, 4B, 5A, 5B, 6A, 6B, 7A, 7B, 8A, and 8B.

Figure 11:
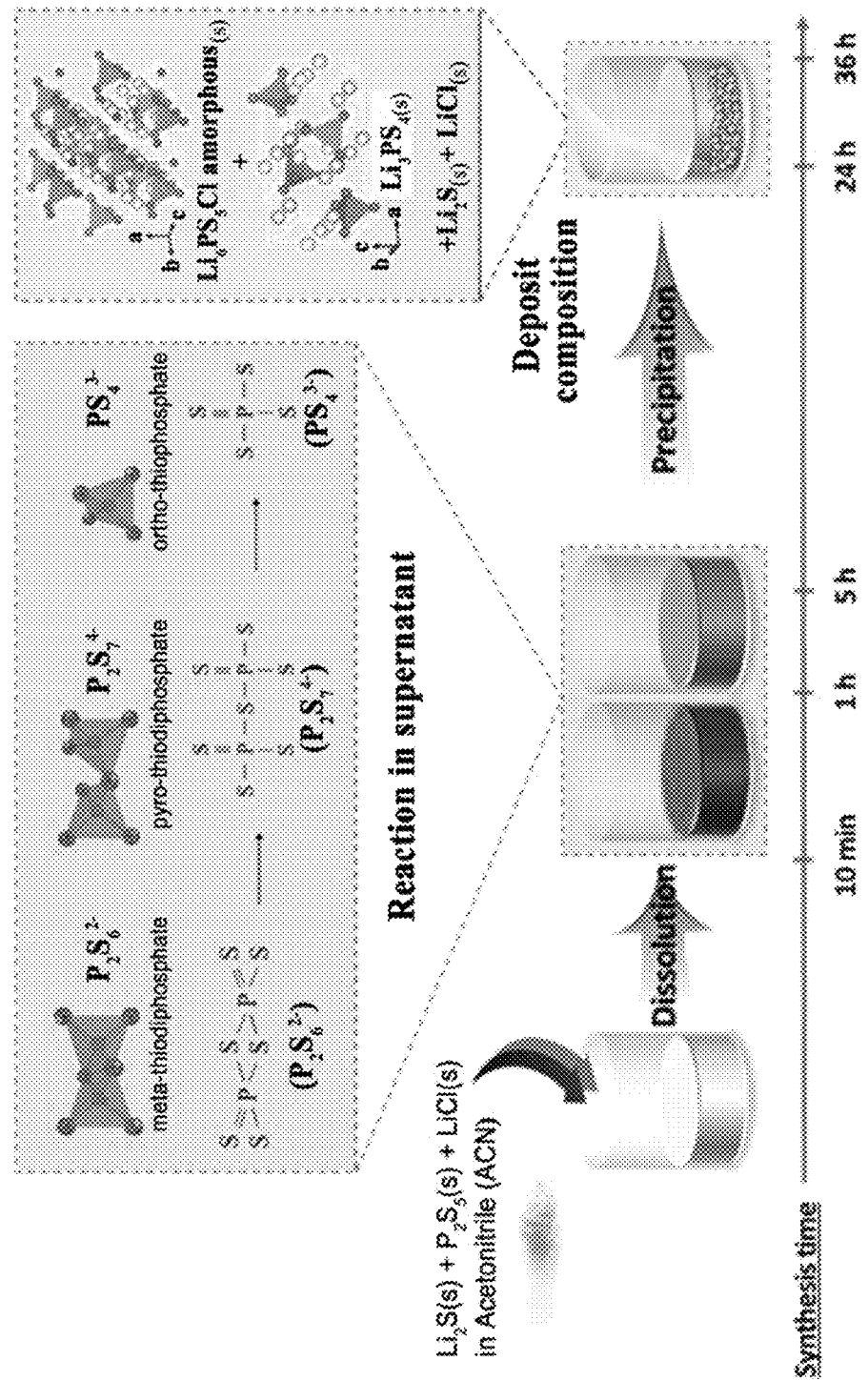
FIG. 11 is a schematic diagram showing a reaction in the supernatant and the composition of a deposit including a precipitate, which are derived from the analysis results as shown in FIGS. 3A, 3B, 4A, 4B, 5A, 5B, 6A, 6B, 7A, 7B, 8A, and 8B.

Referring to FIGS. 10 and 11, it was assumed that Li$_2$S and LiCl started to be dissolved to produce a reacting solution after the Li$_2$S and LiCl were added into acetonitrile and stirred for a predetermined period of time, and when P$_2$S$_5$ was added into the reaction solution and stirred for a predetermined period of time, 3 moles of Li$_2$S and 1 mole of P$_2$S$_5$ dissolved in the solvent were reacted as shown herein to form 2 moles of Li$_3$PS$_4$ solvated with acetonitrile.

Specifically, it was assumed that 1 mole of Li$_2$S and 1 mole of P$_2$S$_5$ were first reacted in the supernatant to generate 1 mole of Li$^{2+}$P$_2$S$_6$$^{2-}$, the Li$^{2+}$P$_2$S$_6$$^{2-}$ was then reacted with 1 mole of Li$_2$S to generate 1 mole of Li$^{4+}$P$_2$S$_7$$^{4-}$, and the Li$^{4+}$P$_2$S$_7$$^{4-}$ was then reacted with 1 mole of Li$_2$S to generate 2 moles of Li$^{3+}$P$_2$S$_4$$^{3-}$.

It was assumed that a portion of the Li$^{3+}$P$_2$S$_4$$^{3-}$, that is, the solvated Li$_3$PS$_4$, precipitated into crystalline Li$_3$PS$_4$, and the remaining Li$^{3+}$P$_2$S$_4$$^{3-}$ precipitated into amorphous Li$_6$PS$_5$Cl along with dissolved Li$_2$S and LiCl.

Figure 12A:
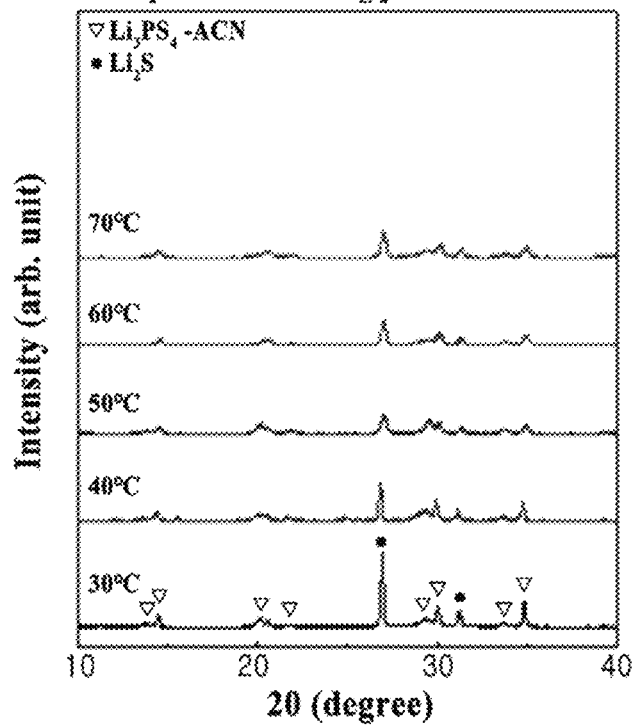
FIG. 12A is an XRD graph of the resulting products obtained before heat treatment in the course of Preparation Examples 4 and 8 to 11.
Figure 12B:
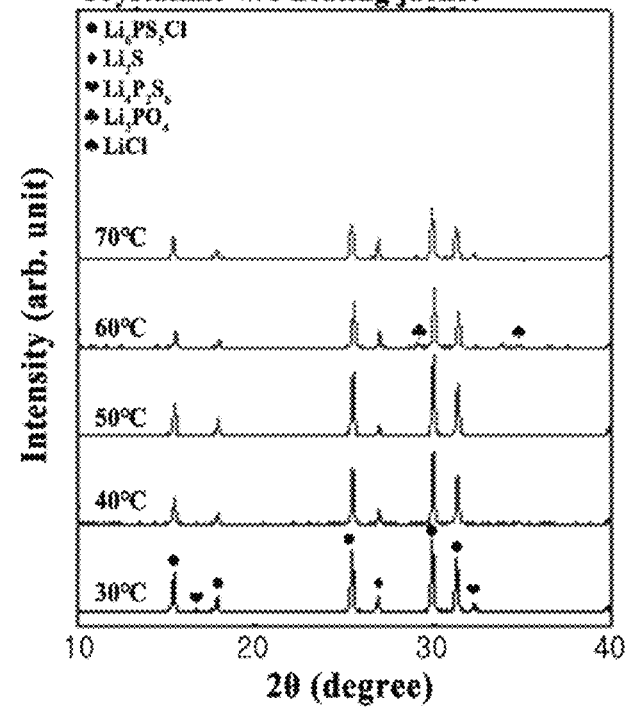
FIG. 12B is an XRD graph of the resulting products obtained after the heat treatment in the course of Preparation Examples 4 and 8 to 10.

FIG. 12A is an XRD graph of the resulting products obtained before heat treatment in the course of Preparation Examples 4 and 8 to 11, and FIG. 12B is an XRD graph of the resulting products obtained after the heat treatment in the course of Preparation Examples 4 and 8 to 10.

Referring to FIGS. 12A and 12B, it can be seen that Li$_6$PS$_5$Cl having excellent crystallinity was able to be obtained when the reaction was performed at an elevated reaction temperature of 40 to 60° C. as the reaction time reached 24 hours.

Figure 13:
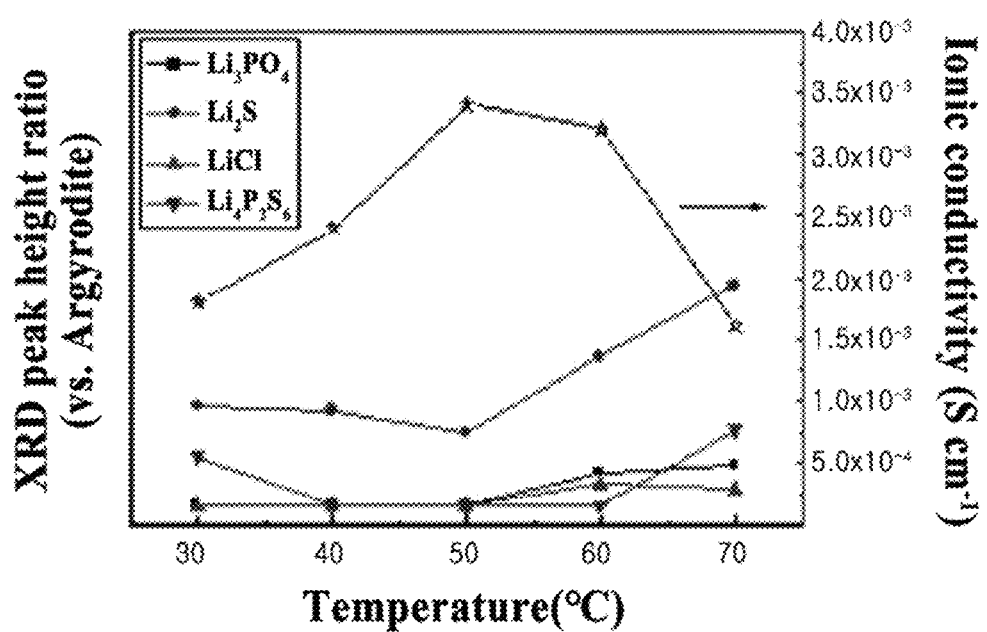
FIG. 13 is a graph showing ratios of intensities of peaks of impurities relative to the intensity of a Li$_6$PS$_5$Cl peak obtained in the XRD graph of the resulting products of Preparation Examples 4 and 8 to 11 as shown in FIG. 12B, and ionic conductivities of the resulting products of Preparation Examples 4 and 8 to 11.

FIG. 13 is a graph showing ratios of intensities of peaks of impurities relative to the intensity of a Li$_6$PS$_5$Cl peak obtained in the XRD graph of the resulting products of Preparation Examples 4 and 8 to 11 as shown in FIG. 12B, and ionic conductivities of the resulting products of Preparation Examples 4 and 8 to 11. Also, the following Table 3 lists the crystal-phase fractions and ionic conductivities of the resulting products of Preparation Examples 4, 5, and 8 to 10 and Comparative Example 1.

TABLE 3

| | Reaction temperature (° C.) | Total reaction time (h) | Crystal-phase fraction (% by weight) | | | | | Ion Iconductivity (mS/cm) |
|---|---|---|---|---|---|---|---|---|
| | | | Li$_6$PS$_5$Cl | Li$_2$S | Li$_4$P$_2$S$_6$ | LiCl | Li$_3$PO$_4$ | |
| Preparation Example 4 | 30 | 24 | 89.4 | 4.9 | 5.7 | — | — | 1.5 |
| Preparation Example 5 | 30 | 36 | 90.8 | 7.2 | — | 2.0 | — | 2.1 |
| Preparation Example 8 | 40 | 24 | 90.7 | 7.2 | — | 2.1 | — | 2.4 |
| Preparation Example 9 | 50 | | 95.1 | 4.8 | — | — | — | 3.4 |
| Preparation Example 10 | 60 | | 93.0 | 4.0 | — | 1.0 | 1.9 | 3.2 |
| Comparative Example 1 | 30 | | 88.6 | 5.1 | 6.3 | — | — | 1.5 |

Referring to FIG. 13 and Table 3, it can be seen that the resulting products had excellent crystal quality because LiCl had relatively low fraction, Li$_4$P$_2$S$_6$ did not detected, and Li$_6$PS$_5$Cl had relatively high fraction at a reaction temperature of 40 to 60° C. when the reaction time was 24 hours. Also, it can be seen that the resulting products had excellent ionic conductivity at a reaction temperature of 40 to 60° C. when the reaction time was 24 hours. However, it can be assumed that, when the reaction temperature was greater than or equal to 60° C. or even greater than or equal to 70° C., the resulting products become highly reactive and thus reacted with a trace of oxygen present in the solvent or a glove box to form a lithium phosphorus oxide as an impurity, and thus a solid electrolyte having lower ionic conductivity was obtained due to the impurity.

As described above, the argyrodite crystal-type solid electrolyte can be obtained with high purity using a solution synthesis according to the present invention.

While the invention has been shown and described with reference to certain exemplary embodiments thereof, it will be understood by those skilled in the art that various changes in forms and details may be made therein without departing from the spirit and scope of the invention as defined by the appended claims.

What is claimed is:

1. A method of manufacturing an argyrodite-type solid electrolyte, comprising:
    a first step of adding precursors represented by the following Formulas 1 and 2 into a polar aprotic solvent, followed by stirring to obtain a reaction solution;
    a second step of adding $P_2S_5$ into the stirred reaction solution, followed by further stirring to form a precipitate obtained as a result of a reaction in the reaction solution; and
    a third step of drying and heat-treating the reaction solution in which the precipitate is formed to obtain a solid electrolyte:
    wherein, in the second step,
    after solvated $P_2S_6^{2-}$ is formed in the reaction solution, the $P_2S_6^{2-}$ is converted into solvated $PS_4^{3-}$, and a portion of the $PS_4^{3-}$ forms amorphous $A_6PS_5X$ as a precipitate along with $A^+$, $A_2S$, and $AX$, and
    the reaction solution comprises a deposit including the precipitate and a supernatant above the deposit, and the reaction is performed until a fraction of $PS_4^{3-}$ ions becomes higher than a fraction of $P_2S_6^{2-}$ ions in the supernatant, and a fraction of the precipitated $A_6PS_5X$ becomes higher than a fraction of $A_2S$ in the deposit, $A_2S$                           [Formula 1]

$AX$                            [Formula 2]

wherein A represents an alkali metal, and X represents an element of the halogen group.

2. The method of claim 1, wherein the polar aprotic solvent has a nitrile group.

3. The method of claim 2, wherein the polar aprotic solvent having a nitrile group is acetonitrile.

4. The method of claim 1, wherein, in the first step, the precursors represented by Formulas 1 and 2 are at least partially dissolved in the solvent.

5. The method of claim 1, wherein the reaction is performed until a fraction of the precipitated $A_3PS_4$ becomes higher than a fraction of the $A_6PS_5X$ in the deposit.

6. The method of claim 5, wherein, in the deposit, the $A_3PS_4$ has a fraction of 50 to 65%, the $A_6PS_5X$ has a fraction of 25 to 35%, the $A_2S$ has a fraction of 5 to 15%, and the AX has a fraction of 1 to 10%.

7. The method of claim 1, wherein, in the third step, the amorphous $A_6PS_5X$ is crystallized through heat treatment so that the amorphous $A_6PS_5X$ is converted into $A_6PS_5X$ having an argyrodite crystal phase.

8. The method of claim 1, wherein, in the second step, a remaining portion of the $PS_4^{3-}$ precipitates into $A_3PS_4$ along with $A^+$.

9. The method of claim 8, wherein, in the third step, $A_2S$ and AX are reacted with the $A_3PS_4$ precipitate and $3A^+$ and $PS_4^{3-}$ remaining in the supernatant, and then crystallized to form $A_6PS_5X$ having an argyrodite crystal phase.

* * * * *